May 15, 1962  H. CHRISTENSEN  3,035,175
RADIANT-ENERGY TRANSLATION SYSTEM
Filed Nov. 6, 1947
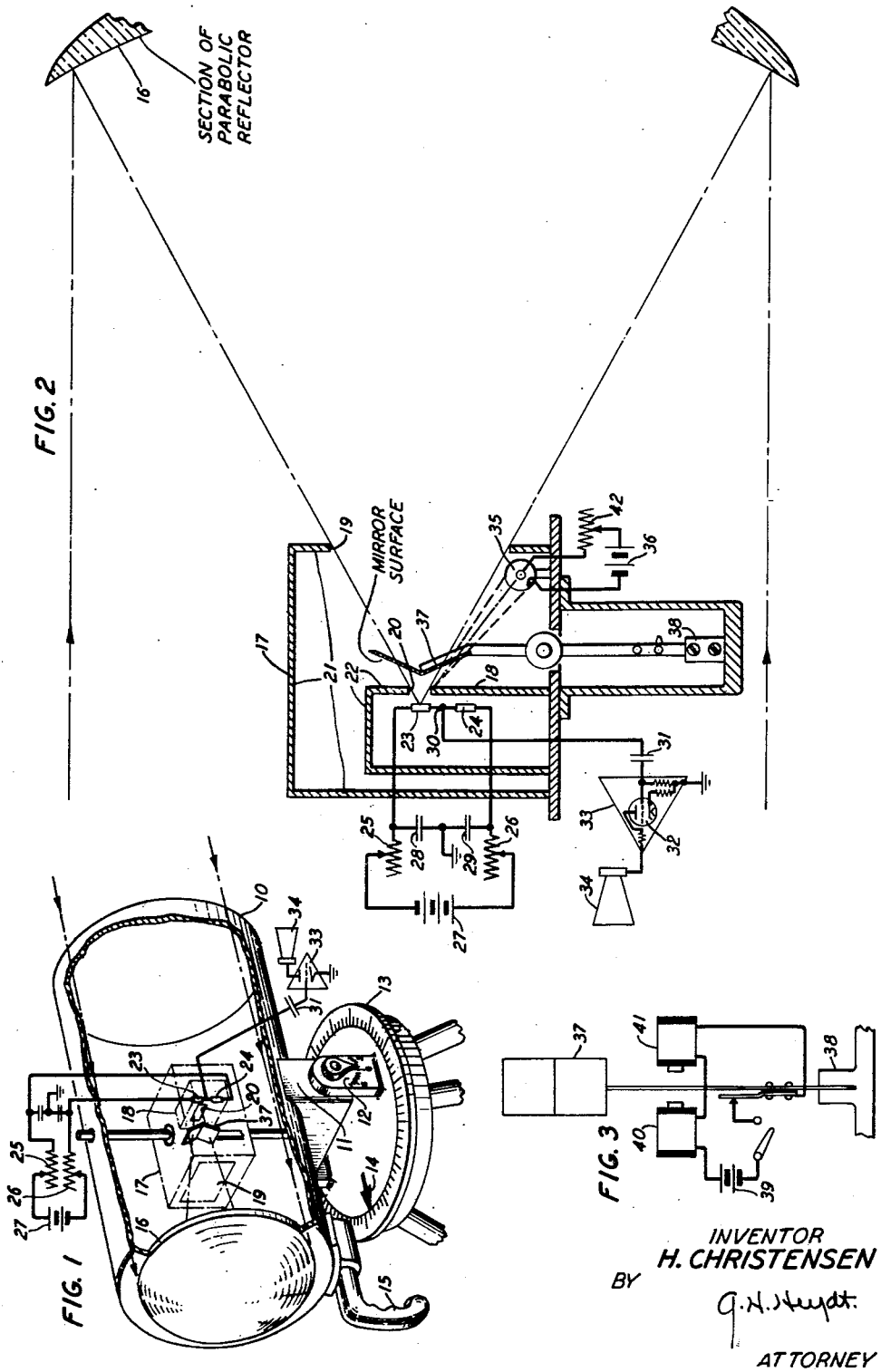
INVENTOR
H. CHRISTENSEN
BY
ATTORNEY 3,035,175
RADIANT-ENERGY TRANSLATION SYSTEM
Howard Christensen, Springfield, N.J., assignors to Bell
  Telephone Laboratories, Incorporated, New York,
  N.Y., a corporation of New York
       Filed Nov. 6, 1947, Ser. No. 784,345
            8 Claims. (Cl. 250—83.3)

The invention relates to radiant-energy detection systems and in particular to detection systems and methods utilizing infra-red radiations.

An object of the invention is to provide an improved system for detecting sources of electromagnetic radiation.

Another object is to provide apparatus for comparing radiations emanating from a thermal-energy source with radiations from a regulatable thermal-energy source.

Other objects and uses of the invention will be apparent from a study of the specifications and drawings.

The system according to the invention may utilize radiation from the ultra-violet, visible light and infra-red wave bands, or from any one of these wave bands. In the preferred embodiment of the invention infra-red radiations of wavelengths from 7000 to $4 \times 10^6$ angstrom units are used.

The preferred embodiment of the invention comprises thermal-energy detection equipment designed to collect thermal-energy radiations emanating from an area under observation, and to focus these collected radiations upon a thermal-energy sensitive unit. The focussed radiations are intermittently interrupted in their impingement upon the sensitive unit, and radiations from a synthetic field of view within the equipment are substituted for comparison purposes during the interruption period. The system contrasts the thermal-energy radiation intensities from the area under observation with those from the synthetic field of view within the equipment, and when a difference occurs in the contrasted intensities signal pulses are originated under control of the sensitive unit.

Examples of thermal-energy sensitive units commonly used in detection devices are thermocouples, thermopiles, photoelectric cells and bolometers. In the preferred embodiment of the invention as described herein a thermistor-bolometer unit is used, a bolometer being a device utilized to detect or measure small quantities of thermal energy by means of a thermally induced change in the bolometer resistance. The thermal-energy sensitive elements in a thermistor-bolometer are made from a thermistor material which is especially sensitive to temperature changes. Thermistor-bolometers may be manufactured as shown in United States Patent 2,414,792 issued January 28, 1947, to J. A. Becker, and thermistors may be constructed as shown in United States Patent 2,414,793 issued January 28, 1947, to J. A. Becker and H. Christensen, or any other satisfactory methods may be utilized. Suitable materials for use in thermistor-strip construction are one or more of the oxides of cobalt, copper, iron, zinc, nickel, manganese or uranium. Good results have been attained using a thermistor material composed of the combined oxides of manganese, nickel or cobalt. Some thermistors have a negative temperature cofficient and they may also be obtained with different specific resistances. Thermistors usually are connected as arms in a normally balanced bridge configuration. An image of a distant thermal-energy source is formed by reflection upon a thermistor-strip bridge arm, and this image impingement increases the strip temperature thus changing the strip resistance. The change in the resistance of the thermistor strip causes a momentary unbalance of the bridge. The unbalance of the bridge results in a voltage potential transient across the bridge and this transient is amplified and fed to signal indication equipment. The output voltage potential developed from the unbalance of the bridge circuit is a measure of the thermal-energy radiations impinging upon the thermistor strip, and receipt of a signal informs an observer that the detection system is in directional alignment with a thermal-energy source. Approximately $10^{-7}$ watts of thermal energy incident upon a thermistor-strip type of bolometer for a few milliseconds may be detected, and will vary the temperature of the sensitive strip by about a millionth of a degree Centigrade.

The system is effective even when a thermal-energy source does not emit rays in the visible spectrum, and since this particular type of detection device emits no telltale signals there is small possibility of knowing that the equipment is being used. In scanning a panorama composed of a number of thermal-energy sources a transient voltage pulse is originated by each passage of an image of a heat source across a thermistor strip. The duration of each transient pulse will depend upon the time taken by the thermal image to cross the strip, upon the thermal-response time of the strip, and also upon the relative dimensions of the image and the strip. A variety of signal indication equipment may be used to record thermal-energy signals. Examples of such equipment are loudspeakers, neon indicators, audible alarms, oscilloscope systems and recorders.

Referring to the drawings:

FIG. 1 is a schematic showing of an embodiment of the invention;

FIG. 2 is a side view showing details of a part of the equipment of FIG. 1;

FIG. 3 is a schematic detail of a front end view of the chopper mechanism of FIGS. 1 and 2.

Referring to FIG. 1 there is shown a mobile self-contained detection system in accordance with a preferred embodiment of the invention. A container 10 is positioned upon a tiltable support 11. A side of the container is shown removed in order to observe the arrangement of various component parts situated within the container. The container 10 may be moved axially in a vertical plane, upon motion of the support 11 in suitable arbors, and the angular elevation of the container may be obtained from a vertical position indicator 12. The tiltable support 11 is connected to a turntable mechanism 13, and the container 10 may be rotated upon the turntable 13 and the azimuth position of the container observed from an azimuth position indicator 14. The container 10 may be directed towards sections of an area under observation by means of a handle 15.

Thermal-energy radiations may enter through an open end of the container 10 and impinge upon the surface of a parabolic reflector 16 which is situated within the container. Also situated within the container, and suitably supported as illustrated, is a chamber 17 within which is positioned a compartment 18. In the interest of clarity in the drawing the chamber 17 and the contents of the chamber are shown enlarged in relation to other component parts of FIG. 1. Actually the chamber 17 and the contents therein are as small as is practicable in order to obstruct a minimum of incoming thermal-energy radiation, and to facilitate the impingement of the incoming radiation upon the parabolic reflector 16. The functions of the chamber 17 and the compartment 18 may be understood from a study of the enlarged view shown in FIG. 2.

Referring to FIG. 2 there are shown an opening 19 in the chamber 17 and an opening 20 in the compartment 18. The interior surfaces 21 of the chamber 17, and the exterior surfaces 22 of the compartment 18 are "black" so that these surfaces will radiate as much thermal-energy radiation as they may absorb. Within the compartment 18 there is situated a thermal-energy sensitive element 23. The element 23 is positioned within the compartment 18 so that thermal-energy radiations from the reflector 16 may be focussed upon the front surface of element 23 through the openings 19 and 20. The element 23 is contained as an arm of a bridge configuration which includes a resistor 24, adjustable resistances 25 and 26 and an electromotive source 27. Bridged across the circuit are condensers 28 and 29 and one plate of each condenser is connected to ground as shown. The resistor 24 may be of a size and material similar to the element 23. A common connection point 30 between element 23 and resistor 24 is connected through a coupling condenser 31 to a grid 32 in an amplifier 33. Only one stage of amplification is shown in the drawing but it will be understood that as many stages of amplification as desired may be utilized. The output from the amplifier 33 actuates a signal device 34.

Situated within the chamber 17 is a controllable thermal-energy source 35 which in the interest of clarity is not shown in FIG. 1. The source 35 is so placed within the chamber 17 that emissions from the source 35 are directed through the opening 20 and impinge upon the front suface of the element 23. The thermal-energy source 35 is energized from an electromotive source 36 through an adjusting resistance 42. While the controllable source 35 may be of any suitable type, in one embodiment of the invention a platinum wire is used as the source and is positioned within the chamber 17 so as to focus the platinum wire in a horizontal line through the opening 20 across the front surface of the sensitive element 23. Within the chamber 17 and situated in front of the opening 20 in the compartment 18 is a chopper 37. The chopper may be a V-shaped cross-sectional device of metal or other suitable reflecting material bent along a straight line so as to form the intersection line of two polished plane surfaces. The chopper 37 is adapted for oscillation at a predetermined rate upon a base 38 and is actuated from an electromotive source as will be described. The polished convex sides of the chopper 37 face the opening 20. The chopper performs several useful functions for it modulates thermal-energy radiations, alternately covers and uncovers the opening 20 in compartment 18, and also acts as a reflector. By reason of the fact that the V-edge of the chopper 37 faces the opening 20 the chopper also prevents radiation emitted by the element 23, due to the bias current initiated by the source 27, from being reflected back upon the element.

While the chopper mechanism has been described only in general terms the details of one way in which it may be constructed are shown in FIG. 3.

Referring to FIG. 3, there is shown a front elevation schematic view of a chopper mechanism. The chopper 37 is resiliently mounted for oscillation upon a base 38 and is actuated from an electromotive source 39 and limited in oscillation by pole-pieces 40 and 41.

Referring again to FIG. 2, the system according to a preferred embodiment of the invention is primarily designed for detecting small temperature boundaries encountered in an area scanned, and for indicating the position in azimuth and elevation of thermal-energy sources, which have a different thermal diffusiveness than their surroundings, with respect to the site from which observations are being made. The system may also be utilized to measure the temperatures of local areas even though the thermal boundaries of these local areas may not be clearly defined.

The system operates as follows. The equipment is oriented towards sections of an area under observation by any well-known method. Thermal-energy radiations originating within the particular section under observation are collected by the parabolic reflector 16, a section of which is shown in FIG. 2, and focussed by it through the openings 19 and 20 upon the element 23. The chopper 37 being actuated oscillates back and forth intermittently covering and uncovering the opening 20 in the compartment 18, and intermittently blocking the thermal-energy radiations transmitted from the reflector 16 and from the regulatable source 35 and preventing these radiations from impinging upon the element 23. The interior surfaces 21 of the chamber 17 and the exterior surfaces 22 of the compartment 18 are heated by the local surrounding atmosphere entering through the opening 19 in the chamber 17, and also by thermal emissions from the regulatable source 35. These emissions from the interior surfaces 21 and the exterior surfaces 22 normally do not impinge upon the element 23, and since these surfaces 21 and 22 are "black" they radiate as much thermal energy as they absorb. In a uniformly heated enclosure, such as in the interior of the chamber 17, the chopper 37 will in time reach the same temperature level as the temperature level of the chamber interior, and thereafter the chopper 37 will radiate as much thermal energy as it may absorb. Within the interior of the chamber 17 radiation streams uniformly in all directions, and the amount of radiation impinging upon the chopper 37 in a given time will equal the amount of incident radiation as impinges elsewhere within the chamber 17 per unit area. As stated, when the chopper 37 is positioned in front of opening 20 in compartment 18, the thermal-energy radiations from the parabolic reflector 16 and from the regulatable source 35 are intermittently interrupted and prevented from impinging upon the sensitive element 23. During this interruption period the radiations from the black surfaces 21 and 22 impinge upon the convex surface of the chopper 37 and are reflected by the chopper 37 upon the element 23. This action results in the element viewing the "black" internal radiations emanating from the surfaces 21 and 22 and contrasting them with radiations from the parabolic reflector 16 and from the regulatable thermal-energy source 35. The field of view of the element 23 is alternately shifted from one to the other of these compared radiations, and differences in the amount of radiations from these two fields of view serve to alternately heat and cool the element 23, and this action causes a corresponding change in the resistance of the element 23. When the compared radiations from the two fields of view are equal the biasing bridge circuit network remains in normal balance and no signal pulse is initiated. Suppose a body emitting thermal-energy radiation is located in a section of an area in the orbit of the system. When the system sights the object the radiations collected by the parabolic reflector 16 will be increased by the addition of the thermal-energy radiation emanating from the object. Consequently the amount of radiations focussed upon the element 23 will vary and will result in a change in the element temperature, a corresponding element resistance variation of the element and a momentary unbalance of the bridge circuit. The bridge unbalance initiates a voltage potential across the bridge between the point 30 and ground. This voltage potential is fed through the condenser 31 to the amplifier 33 in the form of an alternating current signal and the amplified output of the amplifier actuates the signal indication device 34. The signal will be interpreted by an observer as an indication of the existence of an unusual temperature condition between the two fields of view being contrasted by the system. The signal indication obtained is derived from a measurement of the temperature difference between the external field of view and that of the housing surrounding the chopper 37, and the housing temperature is utilized for comparison purposes as a standard temperatue.

Background temperature interferences present a problem in the application of thermal-energy detectors. Any difference between the equivalent temperature of a background and the interior housing temperature of the equipment, as introduced into the system field of view by the chopper, will initiate a signal voltage and this signal voltage may be of a value comparable to, or even considerably larger, than the desired increment signal due to target versus background temperature. Obviously the optimum usable sensitivity of the system will be attained when the background temperature and housing temperature are identical. Since the background temperature will usually be lower than that of the chopper, the addition of a regulatable increment of thermal energy, such as is obtained from the controllable source 35 of FIG. 2, to the thermal-energy radiation collected from the actual background will permit the achievement of a balance adjustment so that hot bodies in the field of view may be distinguished from their background. While the system in accordance with the invention may be utilized without the regulatable thermal-energy source 35, the use of the system without the regulatable source may result in a steady constant signal being recorded if, as often happens in actual practice, the background temperature viewed is different from that of the chopper 37. With the regulatable source 35, which is in effect a background compensator, the effective background temperature may be increased twenty degrees for 200 milliwatts heat compensation dissipation and the balance between background and chopper temperatures brought to a point where a minimum of extraneous signals will occur. This range of compensation temperature is sufficient to include all effective temperature differences normally encountered. If it should happen that a field of view is hotter than the chopper it will then be necessary to provide an extra thermal-energy regulatable source for the chopper in order to secure a correct balance.

The small field of view utilized by the particular embodiment of the invention shown herein results in the system having a very high resolving power. For cases where the target is encompassed by the system the narrow field of view assures the attainment of a favorable ratio between an object signal and a background signal. In order to illustrate this point suppose the target is a six-foot man standing upright, and that the particular sensitive element used is two-tenths of a millimeter wide and three millimeters in length. From a distance of one hundred and twenty yards to eight hundred yards the man would be as wide, or wider, than the system field of view but the man's background will show in the height dimension. The uncovered portion of the man's body, particularly his head, would actually convey the largest signal per unit area. However, if it is presumed that the surface of the man is of uniform temperature, the target signal strength would be that of an equivalent black body up to the distance of one hundred and twenty yards. In the location between one hundred and twenty to eight hundred yards the target signal from the man decreases as the inverse distance. Beyond the eight hundred yard range the target signal decreases inversely as the square of the distance.

The amplifier used in the invention is constructed upon principles well known to those skilled in the art and may be made selective to a frequency corresponding to the chopper frequency and with a sharp cut-off for frequencies below the chopper frequency. The sharp cut-off will keep undesirable thermal-noise components at a minimum.

Various modifications may be made in the invention without departing from the spirit and scope thereof, and it is desired that any and all such modifications be considered within the purview of the invention.

What is claimed is:

1. In a thermal-energy system for detecting the presence and position of a thermal-energy source in an area of scan, the combination of a chamber, a compartment situated within said chamber, the interior of said chamber and the exterior of said compartment capable of radiating thermal-energy emissions, a unit sensitive to thermal-energy radiations situated within said compartment, means for collecting thermal-energy radiations originating within said area and focussing them upon said unit, a controllable source of thermal-energy radiations, means for directing said controllable radiations upon said unit, means for intermittently interrupting said area radiations and said controllable source radiations while reflecting emissions from said interior and exterior upon said unit during the interruption interval, an indication circuit including said unit and means in said circuit for initiating voltage transients whenever the intensities of said radiations and said emissions are unequal.

2. The combination of claim 1 in which the sensitive unit is a bolometer of thermistor material and the interruption means comprises a chopper having a V-shaped convex surface.

3. In a thermal-energy translation system for scanning an area to detect and locate an object of a temperature different from that of said area per se, the combination, of a chamber having interior radiating thermal-energy radiations, an element sensitive to thermal-energy radiations situated in said interior, means for collecting thermal-energy emissions from said area and focussing them upon said element, chopper means interposed between said sensitive and collecting means interrupting said focussed emissions, and having the additional function of deflecting thermal-energy radiations from said interior and causing them to impinge upon said element during the interruption interval.

4. In a thermal-energy detection system for determining the presence of an object by means of the difference between the amount of thermal energies emanating from said object and the object background, the combination of a unit sensitive to thermal-energy emissions, means for collecting emissions from said object and said background and focussing them upon said unit, a controllable thermal-energy source emitting radiations which impinge upon said unit, means interposed so as to intermittently interrupt emissions from said object, background and controllable source emissions, a second source of radiation, and said interrupting means being arranged so as to direct thermal energy from said second source toward said sensitive unit and cause it to impinge thereon during the intermittent periods of interruption.

5. In a system for detecting the presence of a thermal-energy source by means of differences between the thermal-energy emissions from said source and the thermal-energy emissions from an area under observation adjacent to said source, the combination of a thermal-energy sensitive unit, means to collect thermal emissions from said source and said adjacent area and focus them upon said unit, a controllable source of thermal-energy emissions directed upon said unit, a chopper having a reflecting surface, said chopper intermittently interrupting said collected and directed radiations and preventing them from impinging upon said unit, a synthetic field of view, said chopper also being arranged so as to direct emissions from said synthetic field of view towards said unit during the intermittent periods of interruption.

6. In a system for detection of a source of thermal-energy emissions situated within a remote area of observation, said source emissions being of different intensity than those which emanate from said area per se, the method comprising collecting thermal-energy emissions from a section of said area, augmenting said collected emissions with thermal emissions from a controllable source so that said collected and augmented emissions are substantially equal to emissions from a local source of thermal energy, contrasting collected emissions from other sections of said remote area and emissions from said controllable source with emissions from said local source, and initiating signals variable in proportion to any difference occurring between said contrasted energies.

7. In a system for detection of a source of thermal-energy emissions situated with a section of an area under observation, said source emissions being of a different diffusiveness than the area per se, the method comprising directing said system towards sections of said area and collecting thermal-energy emissions emanating therefrom, augmenting said collected emissions with emissions from a controllable source of thermal energy so that said collected and augmenting emissions together substantially equal the thermal emission of a comparison source, maintaining said augmenting emissions at a fixed value while said collected emissions are variable in accordance with the thermal emissivity of whatever particular section is in alignment wtih said system, contrasting said collected and augmenting thermal emissions with said comparison source of emissions, and initiating signals proportional to any difference between the contrasted emissions.

8. In a thermal-energy detection system for scanning sections of an area under observation and for determining the presence of an object by means of differences in the amounts of thermal-energy radiations emanating from said object and from the surroundings of said object, the combination of a unit sensitive to thermal-energy radiations, means for collecting thermal-energy radiations from said surroundings and focussing them upon said unit, a controllable thermal-energy source emitting radiations which impinge upon said unit, interrupting means interposed so as to intermittently interrupt said surrounding and controllable source radiations, a second source of radiation substantially equal to the sum of the radiations from said surrounding and controllable sources, said interrupting means directing radiations from said second source upon said unit during the interruption interval, an indication circuit including said unit, and means in said circuit for initiating voltage potentials variable with differences which may occur in the amounts of thermal-energy impinging upon said unit when in the course of said scanning a section of said area occupied by said object is reached.

References Cited in the file of this patent

UNITED STATES PATENTS

| | | |
|---|---|---|
| 1,816,047 | Keuffel | July 28, 1931 |
| 2,237,193 | Mobsby | Apr. 1, 1941 |
| 2,413,788 | Sargeant | Jan. 7, 1947 |
| 2,442,298 | Liston | May 25, 1948 |